July 27, 1965

O. CHATELAIN ETAL  3,197,779
TACHOGRAPH ADAPTED TO RECORD THE PERIODS OF REST OF
VEHICLE DRIVERS WORKING IN ALTERNATION

Filed March 15, 1962

July 27, 1965
O. CHATELAIN ETAL
3,197,779
TACHOGRAPH ADAPTED TO RECORD THE PERIODS OF REST OF
VEHICLE DRIVERS WORKING IN ALTERNATION
Filed March 15, 1962
4 Sheets-Sheet 2
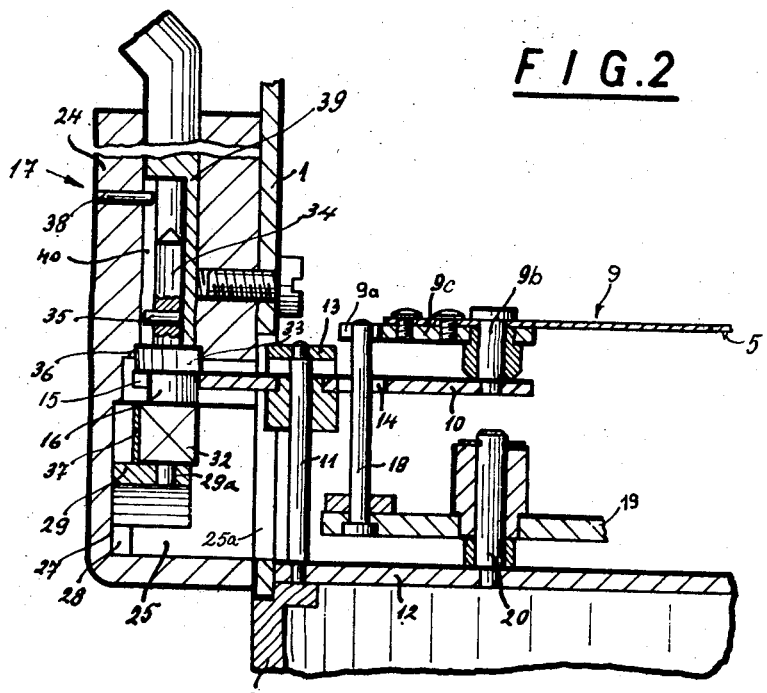
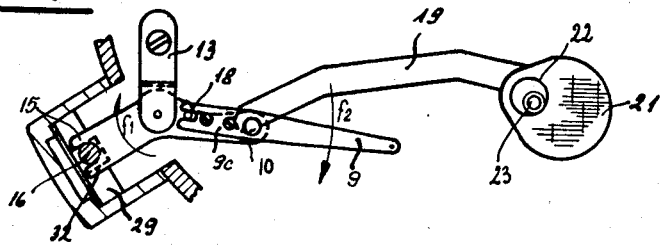
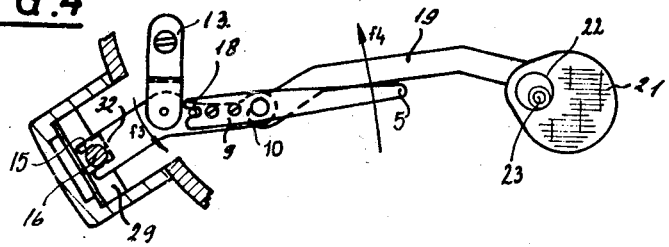

July 27, 1965

O. CHATELAIN ETAL 3,197,779

TACHOGRAPH ADAPTED TO RECORD THE PERIODS OF REST OF
VEHICLE DRIVERS WORKING IN ALTERNATION

Filed March 15, 1962

United States Patent Office 3,197,779
Patented July 27, 1965

3,197,779
TACHOGRAPH ADAPTED TO RECORD THE PERIODS OF REST OF VEHICLE DRIVERS WORKING IN ALTERNATION
Oscar Chatelain and Maurice Jeanmonod, La Chaux-de-Fonds, Switzerland, assignors to Zenith S.A., Le Locle, Switzerland, a Swiss company
Filed Mar. 15, 1962, Ser. No. 179,959
Claims priority, application Switzerland, Sept. 15, 1961, 10,767/61
5 Claims. (Cl. 346—7)

Tachographs for vehicles are known which include a tracing member rigid with a mass rocking against the action of a return spring while the vehicle is running so as to draw on a disc, strip or the like movable support a trace of a predetermined breadth indicating the duration of running or else a narrw line, in particular when the vehicle is at a standstill.

Some of these tachographs are furthermore equipped with means for varying the position of the stylus on the support depending on the driver who is on duty, whereby it is possible to check both the time of running, the time of rest of each driver and the manner of driving of said driver.

The major drawback of such instruments is their comparatively large size since a considerable space is required inside them with a view to allowing the mass to oscillate freely in different areas according to the track to be recorded on the support. The space can obviously not serve for inserting therein the different parts and mechanisms required for the operation of the tachograph and it increases with the number of oscillatory areas to be provided for the mass, that is of separate tracks to be recorded.

These instruments do not allow to make a distinction between the stoppages required for loading and unloading and the stoppages required for the periods of rest allowed to each driver.

The object of the present invention is a tachograph for vehicles including means for checking the behaviour during service time of at least two vehicle drivers. The new and improved tachograph eliminates the above drawbacks and includes a tracing member drawing on a movable support a line defining the behaviour, a mass adapted to oscillate through a predetermined angle when the vehicle is running, means connecting the mass with the tracing member to make the tracing member oscillate and draw on the movable support a strip of a predetermined breadth when the mass oscillates and a thin continuous line when the mass is stationary, and lastly by means allowing a modification in the operative position of said member in the support according to the driver who is actually driving.

According to the invention, connecting means are designed in such a manner that the area in which the mass oscillates does not change whatever may be the operative position of said member on its support.

Another object of the invention is the operation of such a tachograph wherein the tracing member may be shifted over the support in such a manner that it can draw three separate lines on corresponding tracks with a view to recording the duration of the rest periods of two drivers during their respective time of duty; according to the invention, two tracks out of three are used by drivers of the vehicle with a view to recording on the corresponding track a line defining the movement of the vehicle during their time of duty, excluding their periods of rest while the tracing member is shifted from the corresponding track onto the third track at the beginning of a period of rest and is returned onto said co-operating track at the end of said period of rest in such a way as to draw on said third track a line corresponding to the duration of this period of rest.

The attached drawings illustrate by way of example a preferred embodiment of the invention. In said drawings:

FIG. 2 is a cross-section view taken through line II—II of FIG. 1.

FIGS. 3 and 4 are detail views of portions of the invention.

Figure 1:
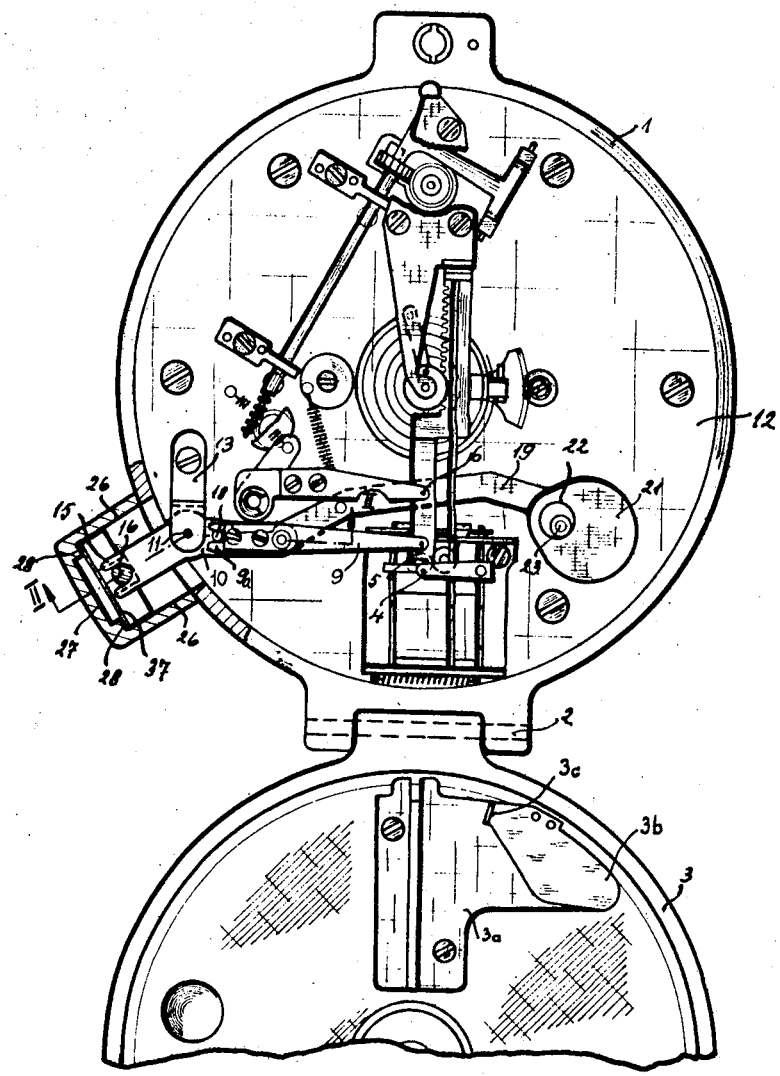
FIG. 1 is a fragmentary view of the tachograph in an open position.

The tachograph illustrated in FIG. 1, includes a case 1 to which is pivotally secured at 2, a cover 3 only part of which is shown. Inside the case are arranged tracing styluses 4, 5 and 6 adapted to draw a record on individual discs of a stack of graph-carrying discs which is not illustrated and which is secured to the cover 3. The record including graphs 70, 80, 90 (FIG. 6) corresponds respectively to the measured speed, to the time of running and of rest and to the distance covered by the vehicle.

The cover 3 includes a clockwork which is not illustrated and which drives the discs, a blade 3a and a selecting tongue 3b provided with a stop 3c. The styluses 4 and 6 are controlled by mechanisms contained in the case and illustrated partly in FIG. 1. All these parts have been well known in the art for many years and need not be described in any greater detail.

The stylus 5 (FIGS. 2 and 3) is rigid with an arm 9 pivotally mounted on a pivot 9b near the end of a lever 10. The lever 10 is provided with a circular opening 14 and terminates with a fork 15 engaging a crank pin 16 described hereinafter, which forms part of a lock 17 rigid with the case 1. A pin 11 and means 13 provide a pivot for the lever 10.

The free end of the arm 9 terminates in portion 9c comprising a fork 9a between the tines of which is fitted the upper end of a rod 18 passing through the opening 14 in the lever 10 while its lower end is rigid with a lever 19. The latter is pivotally secured to the plate 12 at pivot 20 and it carries on its free end a mass 21 which is provided with a circular recess 22. A stud 23 rigid with the plate 12 engages the recess so as to limit the oscillations of the lever 19.

The lock 17 illustrated in FIG. 2 includes outside the case a pipe 24 and a chamber 25 connected with the inside of the case 1 through a corresponding opening formed in the wall of the latter. The chamber 25 includes two walls 26 facing each other (FIG. 1) and a third wall 27 interconnecting the two first walls. The third wall 27 has two vertical surfaces to which is secured through means which are not illustrated, a bridge member 29 provided with a port 29a.

Inside this port is pivotally secured a member 31 comprising a first cube-shaped section 32 over the upper surface of which is raised eccentrically the above-mentioned crankpin 16 engaging the fork 15. A bearing section 33 extends above the stud and the axis of symmetry of which is coaxial with the axis of section 32 and carries a lateral stud 35. The bearing section 33 engages a recess 36 in the pipe 24. An elastic blade 37 is disposed in contact with one face of the cube-shaped section 32 and the ends of which rest on the bearing surfaces of the chamber 25. The pipe 24 is provided with an inwardly extending projection 38 extending transversely in the same vertical plane as the stud 35 when the stylus 5 is in the position illustrated in FIG. 1.

The rotating part of the lock 17 according to FIG. 2, which is arranged between case walls 26 and 27 (FIG. 1), is composed of the rod 34 with the attached element 35, the bearing portion 33, the eccentric part 16 as well as of a square part 32. The cubed member 32 is pivoted by means of a pivot in the opening 29a of a curved member 29. While the square 32 with its pivot, the bearing portion 33 and the rod 34 are arranged coaxial, the eccentric part 16 is supported eccentrically to the before-mentioned parts.

The eccentric part 16 is surrounded by the arms of the fork 15 of the adjusting lever 10. The adjusting lever 10 projecting through the connection opening 25a between the inside body of the tachograph and the inside chamber 25 of the lock 17. The possible rest positions of the square 32 are determined by the spring 37 which presses against it.

The key, each driver has one, which is introduced into the key tube 24 of the lock 17 is composed of a tubular part 39 (FIG. 2), the inside dimensions of the tubular part 39 are in accordance with the diameter of the rod 34. In order to allow said key to be directed past the rigid pin 17 and also past the attached member 25 on the rod 34, the key is designed with an elongated slot 40. In order to allow the key after entering to be turned in a certain direction, another circular parallel slot is designed in the side of the pin 38. This slot extends from the pin 38 to the one or the other side (i.e. before or behind the drawing plane according to FIG. 2). The keys of both drivers are different from each other and this horizontal slot is designed in such a way that one driver can turn this key only in the one direction and the other driver only in the other direction. In one case the rod 34 is turned together with the attachment 35 to the right and in the other case to the left whenever the respective driver starts his working hours.

By turning the rod 34, the bearing 33, the eccentric part 16 and the square 32 by one-fourth revolution, as illustrated in FIGS. 3 and 4, the adjusting lever 10 is turned around the shaft 11 in one instance a bit to the right, in the other instance a bit to the left, according to the eccentricity of the eccentric part 16. Thereby, the axis of rotation 9b of the support 9 moves accordingly around its center of rotation, that is to say the pin 18. This movement causes the adjustment of the zero-position of the stylus 5.

In order to pull the key out, it must be turned back to its initial position a quarter revolution, in order to be allowed to pass through because of pin 17. With this revolution, the eccentric part 16, and therefore also the adjusting lever 10 with the support 9 are returned to their initial positions. This position being in accordance with the "rest period position" of the stylus 5.

Figure 6:
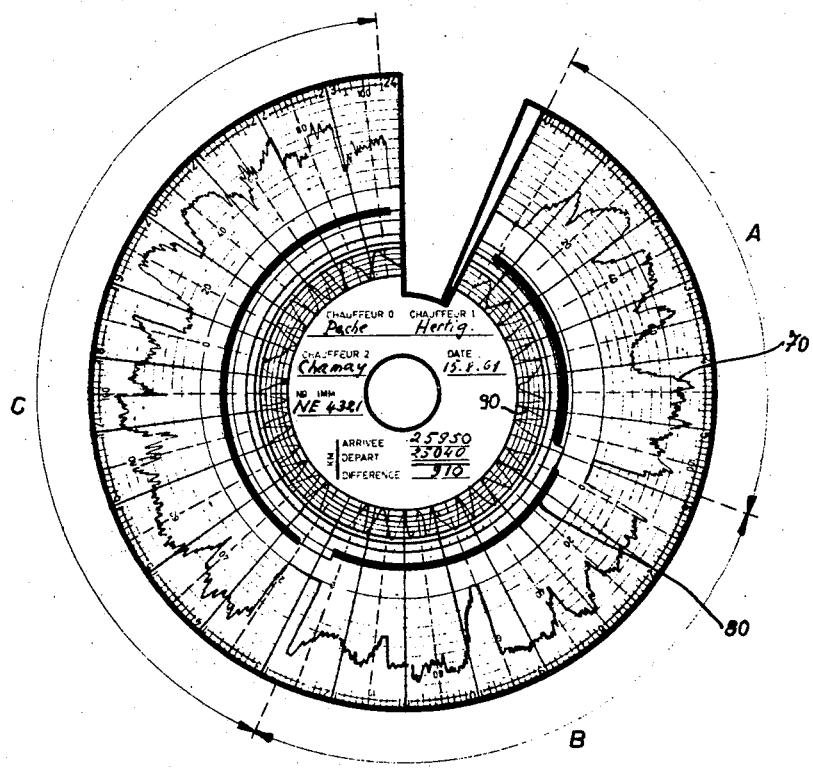

The turning of the key in either direction produces a corresponding movement of the member 31. Thus, when turning the key counter clockwise, the crank pin 16 on the eccentric driven pin assumes the position illustrated in FIG. 4 since it constrains the fork 15 of the lever 10 to move in the direction of the arrow f3. The lever 10 thus shifted shifts in turn the lever 9 and the latter which engages the stationary rod 18 is constrained thereby to rock round said rod in the direction of arrow f4. Obviously the stylus 5 rigid with the lever 9 follows the movement of the latter. The line drawn by the stylus is that shown along the arc A on the diagram 80 (FIG. 6).

The stylus 5 when returned into the position illustrated in FIG. 1, draws the line shown along the arc B according to the time of duty of the second driver.

The line along the arc C corresponds to the time of duty of a third driver, if any, and it is obtained by setting the stylus in the position illustrated in FIG. 3. The broad section of each line corresponds to the periods of running of the vehicle whereas the thinner sections correspond to the stoppage periods.

The improved tachograph may also serve for checking the periods of running and of stoppage during the times of duty of the two drivers, the stoppages being necessary for instance for loading and unloading the vehicle; the tachograph serves also for checking the duration of the rest periods allowed for each driver when on duty.

Figure 7:
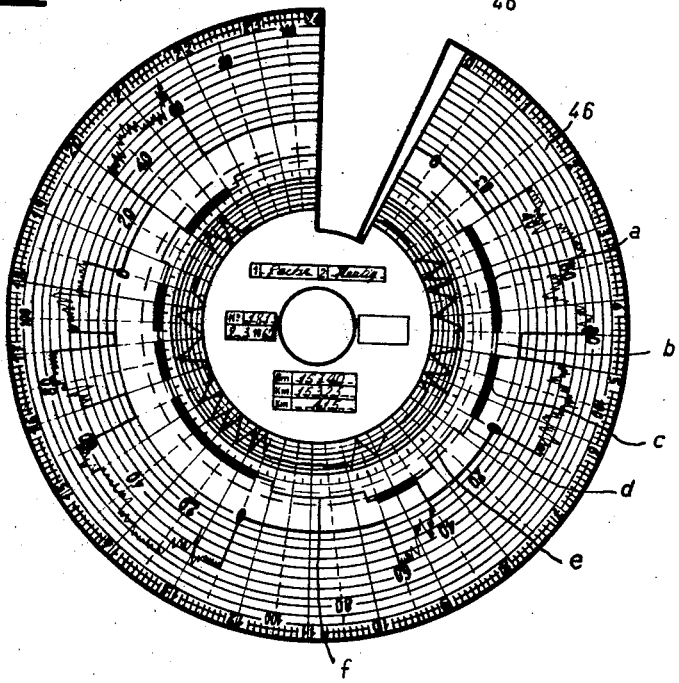
FIGS. 6 and 7 are plan views of the graph-carrying discs serving as movable supports in the tachograph.

To each driver there is then allotted on the movable support a track to be travelled over by the stylus, say one of the two outer tracks in the case illustrated, the third track serving solely for recording the duration of the rest periods. Thus at the beginning of his time of duty (say at 2 a.m.) in the case illustrated in FIG. 7, the first driver shifts the stylus 5 so as to make it draw, on the movable support, the line system a, b, c and d corresponding to running and stopping conditions of the vehicle while he returns manually the stylus into its medial position when his time of rest begins (say at 7 a.m.), in the case of FIG. 7. The stylus then draws the arc e of a circle at a level lower than the already drawn sections so that the rest period of the driver is easily ascertainable on the graph through the lack of continuity of the line.

Figure 5:
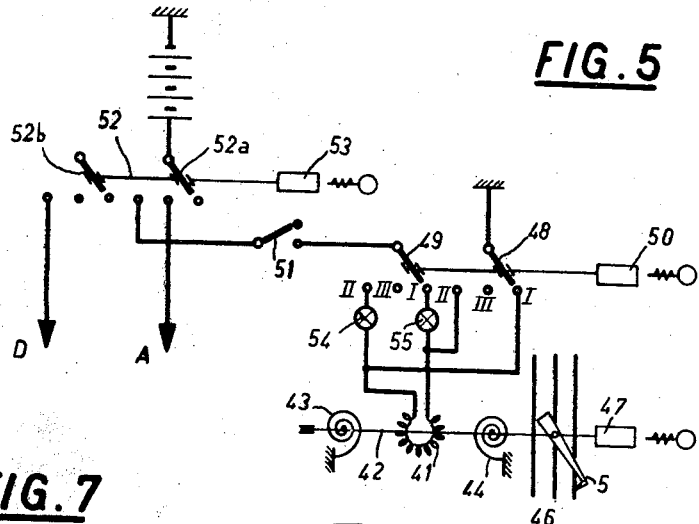
FIG. 5 is a diagram of an arrangement for automatic control of the periods of rest of the drivers.

This rest period may also be recorded automatically on the disc or the like movable support by resorting for instance to a tachograph associated with the circuit illustrated in FIG. 5. In the circuit, a rotary electromagnet 41 of which only the energizing winding is illustrated, controls a spindle 42 subjected to the action of spiral springs 43 and 44 and mechanically coupled with the tracing member 5 of the tachograph illustrated in FIG. 1. The coupling is diagrammatically illustrated and is of the same type as that referred to hereinabove. The spindle 42 carried by the case of the tachograph together with the spiral springs 43 and 44 and the electromagnet 41 is adapted to be shifted into two extreme positions to either side of its medial position of equilibrium in which it is held by the spiral springs, by operation of a lock 47 with which the spindle is connected through one of its ends. The lock may be similar to that described hereinabove. The spindle 42 may also be brought into one of its extreme positions through energization of the electromagnet 41 by a negative or positive current according to the position given to a reversing switch including two arms 48 and 49 of which one is grounded and the other is connected with the storage battery of the vehicle.

The contact-pieces co-operating with the two arms of the switch include two outer contact-pieces I and II connected respectively with the terminals of the electromagnet winding and a central contact-piece III which is insulated so as to cut out the electromagnet. The shifting of the switch arms from one contact-piece to the other contact-pieces II, the electromagnet 41 is energized for instance with a polarity such that the stylus 5 is shifted out of its medial position, for instance into the position illustrated in FIG. 5 whereas if the arms were to co-operate with the contact-pieces I, the stylus 5 would assume a position symmetrical in relation to that which is illustrated.

The arm 49 of the reversing switch is connected with the battery through a first switch 51 adapted to switch off the current feeding the circuit even while the vehicle is running as described hereinafter. A further double switch 52 controls the circuit between the battery and the arm 49. The switch 52 controls selectively the starting means D through its arm 52b and the ignition means A of an internal combustion engine through its arm 52a. A lock 53 for the double switch is provided. Two signal lamps 54, 55 show those outer tracks on which the stylus has been shifted.

For automatic recording of the rest period of each driver, the arms 48 and 49 of the reversing switch are first set over those contact-pieces I or II which are required for operation in a predetermined direction on the lock 50. This being done, the circuit energizing the electromagnet is closed by means of switch 51, after which switch 52 is actuated so as to connect the reversing switch with the battery.

The electromagnet 41 is then energized and controls the shifting of the tracing member 5 into the position illustrated in FIG. 5. Upon starting of the vehicle, the tracing member draws on the movable support 46 firstly a broad strip such as a and then a narrow line such as b corresponding to a stoppage period of the vehicle, as required for instance by partial loading of said vehicle, followed by a further broad strip c and a further narrow line d corresponding to a further running and stoppage of the vehicle. When the driver leaves the vehicle during his period of rest starting say at 7 a.m., he removes the contact key out of the lock 53 whereby he switches off the electromagnet 41. The tracing member or stylus 5 is then automatically returned into its medial position by the co-operating springs 43–44, whereupon it draws on the support 46 an arcuate line e extending along a level underneath the track already drawn on the support and corresponding to the recording of the periods of running or of stoppage for loading or unloading. When the driver resumes operation say at 8 a.m. in the example illustrated and reinserts the contact key, the electromagnet 41 is re-energized whereby the tracing member 5 is returned into its first position without the location of the reversing switch being modified.

The tracing member 5 then continues drawing on the movable support 46 a graph defining the movements of the vehicle during the remainder of the duty period of the first driver.

When the second driver takes the place of the first driver, all he has to do is to shift the arms 48 and 49 of the reversing switch from their contact-pieces II onto their contact-pieces I whereby the electromagnet 41 is energized and the tracing member 5 is shifted from its medial position corresponding to the track 7 on the support 46 into its other, symmetrical position for which the tracing member 5 draws a track at a level lower than the medial track.

Of course, the modified tachograph allows also checking the rest periods of the two drivers through manual actuation as described above, for instance by switching off the current from the electromagnet 41 through actuation of the switch 51 and direct actuation of the lock 47 so as to set the tracing-member in the desired position.

The invention is not limited to the above disclosure and attached drawings and in particular the tachograph may provide a record on strips instead of on discs. Furthermore, although the automatic control means of the drivers' rest periods has been applied in the above example to a vehicle driven by an internal combustion engine, it will be readily understood that it may serve with any other type of vehicle, the shifting of the stylus over the medial track being then controlled by the locking or release of the means controlling the vehicle engine.

What we claim is:

1. In a tachograph for checking the operation of a vehicle by at least two vehicle drivers, in combination, a member rockably driven a given amplitude of reciprocating movement while the vehicle is running, a record medium advanced continuously for recording thereon on different tracks marks indicative of the periods of operation of the respective drivers of the vehicle during respective given periods of time, recording means driven from said rockable member for recording said marks on said record medium, and adjusting means operable by said drivers to variably adjust said recording means to respective operative positions for recording on respective ones of said different tracks without changing the amplitude of movement of said rockably driven member, said adjusting means comprising a pivoted lever movable angularly to two different, stationary angularly spaced positions, a pivot fixed on said lever for movement therewith to said two different positions, said recording means comprising another lever mounted pivotally on said pivot on the first-mentioned lever, a stylus on said another lever for making said marks on said record medium during the advancement thereof, means mechanically connecting said member to said another lever for imparting movement to said another lever from said member for making said marks a width corresponding substantially to the amplitude of reciprocating movement of said member, and pivot means pivotally mounting said member pivotally independent of both of said levers.

2. In a tachograph according to claim 1, in which said adjusting means further comprises means operated by the vehicle drivers individually to position said recording means at said positions corresponding to respective tracks on said record medium for recording thereon wide and narrow indications representative of conditions in which the vehicle was in operation and idle respectively and to a common track for recording rest periods.

3. In a tachograph according to claim 2, in which said adjusting means comprises means rendering effective positioning of said record medium in response to operation of the engine of the vehicle, means for the individual drivers to select which of said tracks will indicate periods of operation and idleness of said vehicle while he is in charge of the vehicle, means for guiding said recording means on the track corresponding to said rest periods, and means to automatically restore the recording means to the track chosen by a given driver for recording vehicle operation upon termination of a given rest period.

4. In a tachograph according to claim 1, in which said adjusting means comprises an electrical circuit, means for automatically moving said recording means to said tracks, the last mentioned means comprising a rotary driven spindle positionable in a medial position of equilibrium and movable in opposite directions for causing movement of said recording means, spring means causing said spindle to assume said position of equilibrium, and means energizable in different polarities for moving said recording means to two of said positions for recording on two outermost tracks relative to a central track corresponding to a recording track of said recording means when said spindle is in said condition of equilibrium.

5. In a tachograph according to claim 4, further comprising means operable selectively when said energizable means is not energized for manually controlling rotary positions of said spindle and means for locking of said spindle in given rotary positions corresponding to the track selected for recording on said record medium.

References Cited by the Examiner
UNITED STATES PATENTS 2,743,987   5/56   Meer _____ 346—7
3,000,687   9/61   Haupt _____ 346—64

LEO SMILOW, *Primary Examiner.*